Sept. 3, 1963    R. R. COSNER ETAL    3,102,421
HIGH SPEED TENSILE TESTING
Filed June 21, 1960    5 Sheets-Sheet 1

INVENTORS
ROBERT R. COSNER
TU-LUNG WENG
BY
Howard K. Kothe
ATTORNEY

Sept. 3, 1963         R. R. COSNER ETAL         3,102,421
               HIGH SPEED TENSILE TESTING
Filed June 21, 1960                      5 Sheets-Sheet 2

INVENTORS
ROBERT R. COSNER
BY TU-LUNG WENG

ATTORNEY

Sept. 3, 1963   R. R. COSNER ETAL   3,102,421
HIGH SPEED TENSILE TESTING
Filed June 21, 1960   5 Sheets-Sheet 3

INVENTORS
ROBERT R. COSNER
TU-LUNG WENG
BY
Howard K. Kothe
ATTORNEY

INVENTORS
ROBERT R. COSNER
TU-LUNG WENG
BY
Howard K. Kotha
ATTORNEY

United States Patent Office 3,102,421
Patented Sept. 3, 1963

3,102,421
HIGH SPEED TENSILE TESTING
Robert R. Cosner, South Charleston, W. Va., and Tu-Lung Weng, State College, Pa., assignors to Union Carbide Corporation, a corporation of New York
Filed June 21, 1960, Ser. No. 37,702
10 Claims. (Cl. 73—97)

The present invention relates to apparatus for testing the physical properties of materials and more particularly to a machine capable of automatically indicating tensile test data while subjecting material test specimens to high-speed elongation at selectable constant velocities. This invention provides for selection of test velocities infinitely variable over the operational velocity limits of the apparatus.

Stress-strain relationship is one of the most widely used indicia of the physical properties of engineering materials. This relationship is usually expressed in a stress-strain diagram in which stress applied to a material sample loaded axially in tension is plotted as ordinate values and strain is plotted as abscissa values on a Cartesian coordinate graph. Points for the construction of the stress-strain diagram are determined by dividing the applied load by the original cross-sectional area of the test specimen to obtain the ordinates and dividing the incremental elongation of a unit length of the test specimen by the original unit length to obtain the corresponding abscissas. It is well known in the materials testing art that the rate of straining, i.e. the velocity at which the test specimen is elongated, has marked effect on the dynamic characteristics of the material. For most materials, an increased straining rate will result in an increase in the stress necessary to attain a given strain at a given testing temperature. For certain materials the reverse is true. Variation of the environmental temperature of the specimen has also been found to change the effect of strain rate variation.

Up to the present time industry has had available a number of commercially produced machines for testing the physical properties of materials by tensile loading. The most commonly used type of tensile testing apparatus comprises a fixed frame supporting a movable crosshead which is operably connected to a driving means. One end of the material sample to be tested is secured to a first holding means on the fixed frame of the test apparatus and the other end is secured to a second holding means on the movable cross head portion. Energizing the driving means causes the movable crosshead to load the sample in tension. The resulting elongation action may be continued by applying additional load increments or, in cases where load is to be treated as a dependent variable, by propelling the moveable crosshead at a constant velocity until sample failure occurs. A variety of load and strain sensing and indicating means are available and are used in various combinations with the commercial testing machines to measure, indicate, and in some instances, record tensile test data during the performance of the test. In order to subject specimens of various materials to the same external treatment, a constant rate of crosshead velocity is sought to be maintained. Since, however, the loading and elongation commence when the crosshead starts from rest, there is, in the presently available testing machines, an acceleration period preceding attainment of the desired velocity, which causes an undesirable attenuation of the constant velocity time period of the test. The maximum crosshead velocities of the commercially available testing machines vary from about twenty to fifty inches per minute, and continuous tensile testing at higher straining rates has not heretofore been possible.

Single point data, i.e. at the point of rupture, may be obtained at higher straining velocities by the art-known impact tests such as the Izod test, ASTM D256–54T, in which a pendulum hammer is swung at a precise point, against a cantilevered notched specimen bar or precise dimensions at a velocity in the order of eight thousand inches per minute. Energy to break is equal to the calculated energy at the instant of impact minus the energy calculated from the observed upswing of the pendulum after it has broken the specimen.

The above described testing methods and apparatuses have been used up to the present time to study the physical characteristics of relatively inelastic materials such as metals, woods and the like, where the total elongation before rupture of the sample is less than the maximum travel limit of the movable crosshead. Where, however, the total travel or elongation required to rupture the sample exceeds the maximum attainable travel distance of the movable crosshead, as is the case with the more elastic materials, it is obvious that these known apparatuses and methods do not yield complete results. The inherent crosshead velocity limitations found in the commercially available apparatuses not only make high-speed tensile testing of the more elastic materials, where the effects of varying strain rates are more pronounced, impossible, but also preclude investigations of the physical properties of the less elastic materials at higher straining rates. The impact type tests, in addition to having the disadvantage of furnishing only single point data, are unsuited for testing those more elastic materials which will deform but not rupture under the impact of the pendulum hammer.

In summary of the foregoing points, it may be stated that the presently available tensile testing equipments are unsuited to the testing of the more elastic types of materials and, in addition, the velocity limitations in these equipments narrow the range of attainable straining rates for testing all materials.

The present invention permits examination of the physical characteristics, particularly the tensile properties, of materials at elongation velocities continuously variable from as low as four inches per minute up to ten thousand nine hundred inches per minute. Due to unique design features, the preselected constant velocity of test is attained with an acceleration period so short as to be negligible, and the velocity is not only maintained constant, but may be verified electrically, for any test. The apparatus of the present invention automatically senses and indicates a calibrated stress-strain diagram developed during the test. Sufficient travel distance is provided to accommodate the most elastic known materials, thereby permitting full elongation to rupture for the samples tested. Data furnished by the testing apparatus of the present invention is completely compatible with data produced by conventional continuous testing machines of lower velocities and the maximum attainable velocity of the present invention encompasses the velocities at which the known impact tests are performed, thus providing for continuous testing where heretofore only single point investigation was possible. By the use of this invention, studies may be conducted, and data obtained on the stress-strain relationships, elastic limits, yield points, moduli of elasticity and other physical characteristics on a spectrum of engineering materials wider and at straining rates higher than hitherto possible with known testing apparatuses. By means of special environmental conditioning cells, the effect of temperature upon specimen behavior may be studied concurrently with load testing.

In general, the apparatus of the present invention comprises a fixed main bed or frame supporting a slideably movable hydraulically actuated driving crosshead capable of being driven along guiding means on the fixed frame at selectable constant velocities within the operational velocity range of the machine. The specimen to be tested is arranged in axially parallel relationship to the driving crosshead travel path. One end of the specimen is firmly held by an anchor jaw and the other end is firmly held by a clamping jaw on a freely movable specimen crosshead. A load sensing means is installed between the specimen anchor jaw and a specimen bed rigidly attached to the main frame of the machine and provides continuous stress sense during the test. Velocity control is accomplished by hydraulic flow control means in combination with a specially designed hydraulic circuit. In operation, a hydraulic fluid flow rate corresponding to the desired driving crosshead velocity is selected, the driving crosshead is locked against movement until pumping means in the hydraulic system has built up sufficient pressure to produce and automatically maintain the required hydraulic flow rate, the driving crosshead is unlocked and accelerates to the preselected desired velocity. As the driving crosshead moves along the guide means on the fixed frame, it passes over the load sensing means, specimen anchor jaw and the specimen, then engages the specimen crosshead and carries it through the remaider of the travel, during which the specimen is strained to failure. The anchor jaw, specimen and specimen crosshead are arranged longitudinally along the driving crosshead travel path on a specimen bed located at a distance from the driving crosshead starting point sufficient to permit full acceleration and consequent attainment of the desired constant velocity before the driving crosshead engages the specimen crosshead and loads the specimen. At the time the specimen crosshead is picked up by the driving crosshead, there is, of course, a slight deceleration and a reacceleration, but the relative masses involved and the fact that the moving crosshead is proceding at the desired velocity at the time it engages the specimen crosshead, make the deceleration-reacceleration time precedent to reattainment of the preselected constant velocity so small as to be negligible. For practical purposes, then, it may be stated that the specimen's attainment of the desired elongation velocity is almost instantaneous. This feature of the present invention gives a unique advantage over the known testing machines, where the time to accelerate a specimen to a desired straining rate begins with the entire apparatus at rest and a constant test velocity is preceded by a relatively long acceleration period.

An indication proportional to the stress-strain relationship of the test specimen is obtained on a cathode-ray oscilloscope by connecting the load sensing means, to which the specimen anchor jaw is attached, to the vertical amplitude oscilloscope input and adjusting the horizontal sweep circuit to correlate the oscilloscope screen abscissa divisions with the desired velocity of straining.

The foregoing brief description of the present invention and additional novel and useful features thereof will be more clearly uderstood and further appreciated from the ensuing detailed description and drawings wherein.

Figure 1:
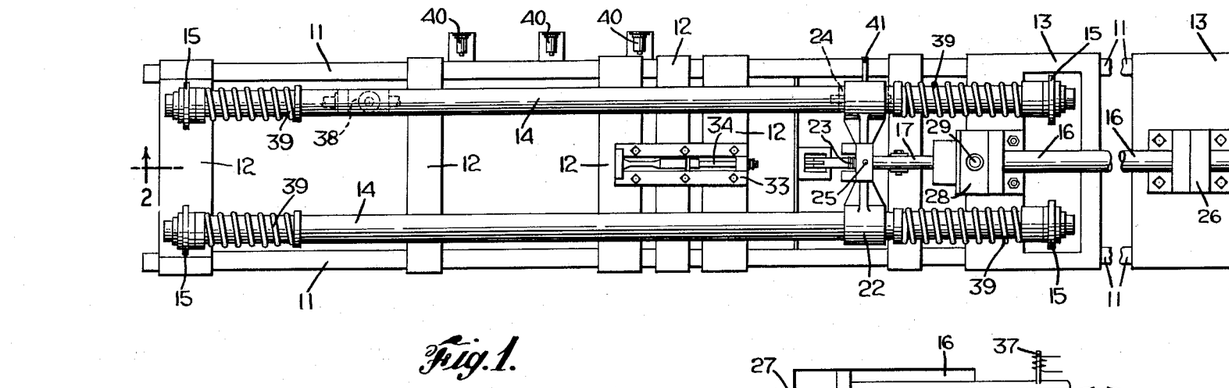
FIGURE 1 is a top view of the main assembly of a high speed materials testing apparatus according to the present invention.
Figure 2:
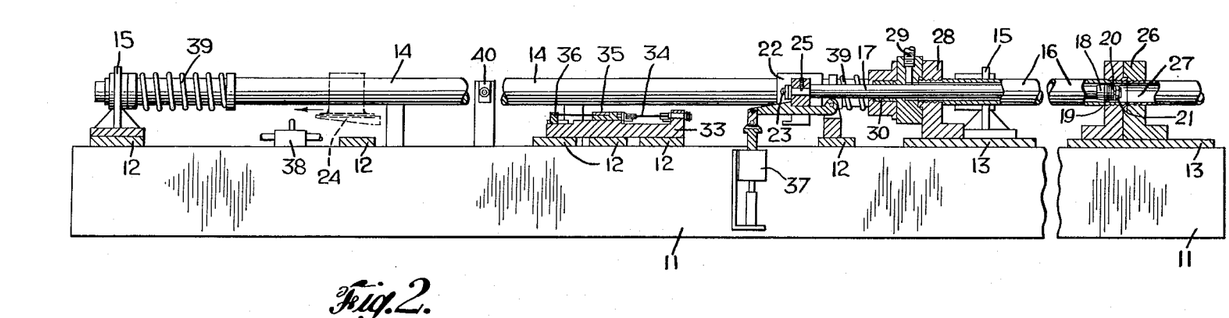
FIGURE 2 is a longitudinal sectional view of FIGURE 1.

In the embodiment of the drawings and with particular reference to FIGURES 1 and 2, a base assembly for the present invention comprises main frame members 11 held in fixed parallel relationship by spacers 12 and mounting plates 13. Guide rods 14, extending from one end of the base assembly to a point beyond the lateral centerline of the apparatus, and arranged in parallel relationship to each other and to main frame members 11, are rigidly fixed to the base assembly by guide rod supports 15. The actuating assembly comprises a cylinder 16 extending from the end of the base assembly opposite the guide rod location to a point beyond the lateral centerline of the apparatus, arranged in parallel relationship to guide rods 14 and main frame members 11 and rigidly fixed to the base assembly by head port split block 26, end port split block 28 and intermediate support members not shown, a piston rod 17 extending through the length of said cylinder and protruding through said end port block; a piston head assembly 18, 19, 20 and 21 arranged on a reduced section of the cylinder-enclosed end of said piston rod and a driving crosshead assembly 22, 23, 24, 25 and 41 arranged on a protruding reduced end portion of said piston rod. The lengths of the above described longitudinal component parts are selected to provide for the desired test travel length. In the preferred embodiment, the component lengths are based upon the geometric characteristics prescribed for standard ASTM tensile specimens.

Figure 3:
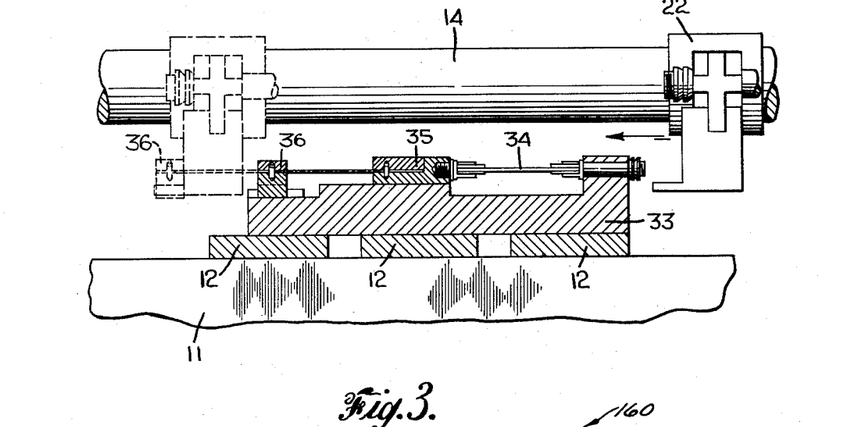
FIGURE 3 is an enlarged sectional view of the specimen holding subassembly shown in FIGURES 1 and 2.

With further reference to FIGURES 1 and 2 and FIGURE 3, a subassembly for holding the specimen to be tested comprises a specimen bed 33 rigidly fixed to spacers 12, load sensing means 34, specimen anchor jaw 35 and specimen crosshead 36. Both specimen anchor jaw 35 and specimen crosshead 36 are adapted to move slideably with negligible friction along the longitudinal axis of the machine on specimen bed 33 and are provided with clamping means to hold the respective ends of the test specimen. Specimen anchor jaw 35, slideably supported in an upwardly projecting portion of specimen bed 33, is attached to load sensing means 34 which is in turn attached to specimen bed 33. In this manner, forces developed in the test specimen are transmitted to load sensing means 34.

A solenoid operated latch 37, rigidly supported between main frame members 11 by a spacer 12, is arranged to lock driving crosshead 22 against movement. When the hydraulic fluid flow rate corresponding to a desired test velocity is attained, solenoid latch 37 is energized and releases the driving crosshead 22, thereby permitting movement of the actuating assembly.

Plunger-operated deceleration valve 38 is rigidly mounted on one of the main frame members 11 and is arranged in such manner that the operating plunger will be depressed when it is slideably engaged by deceleration cam 24, mounted on the underside of one of the outboard journal portions of driving crosshead 22.

Four shock absorbing springs 39 are mounted on the ends of guide rods 14 to cushion the reciprocal movements of the actuating assembly.

A plurality of magnetic pickups 40 is arrayed longitudinally in spaced relationship along one of the main frame members 11 and fixed thereto. Magnetic pickups 40 are successively excited by magnetized rod 41 which is mounted on driving crosshead 22, as the driving crosshead passes each pickup during its test travel. The time relationship of the signals thus generated is used to both calibrate and verify the velocity of tests. Alternatively, magnetic pickups 40 may be arranged in a manner to enable the output signals therefrom to drive the oscilloscope horizontal sweep signals in synchronism with the oscilloscope vertical input load signal.

Figure 5:
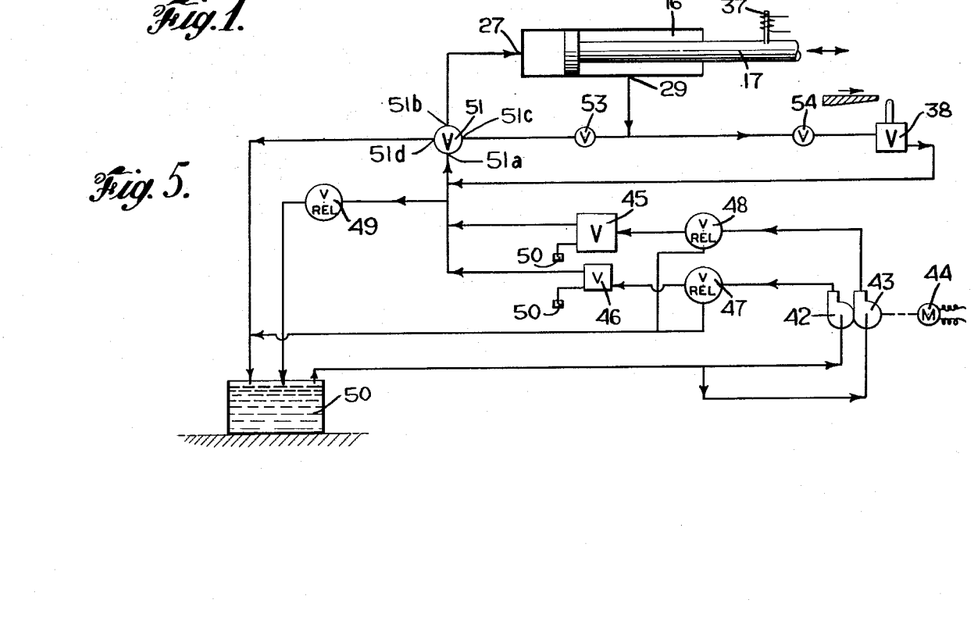
FIGURE 5 is a schematic diagram of the hydraulic actuating and control system according to the present invention.
Figure 6:
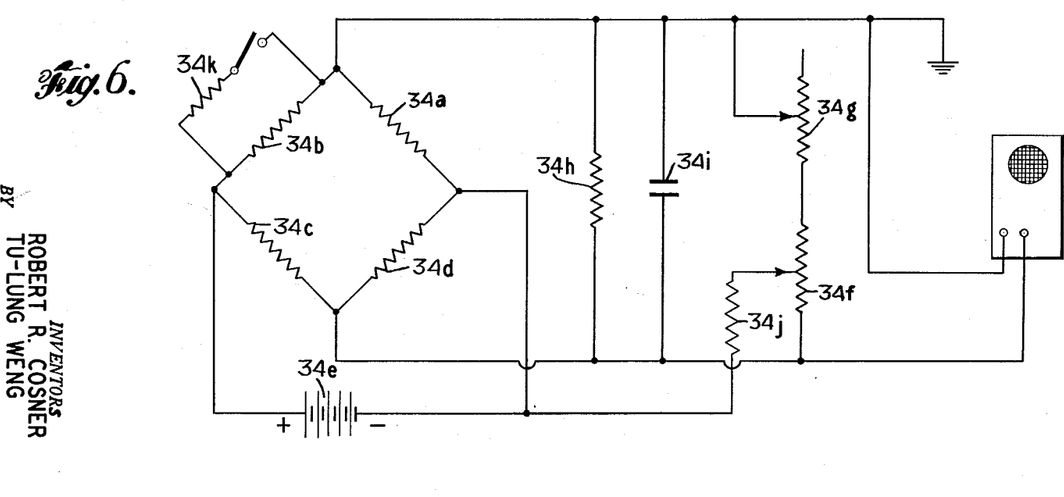
FIGURE 6 is a schematic diagram of a load sensing circuit for the present invention.

Not shown, otherwise than schematically on FIGURES 5 and 6, are the various control, relief and check valves, the fluid reservoir, piping, motor operated pumps and other components comprising the hydraulic system which actuates and controls the high speed tensile tester of the present invention and the various electrical circuit elements and cathode ray oscilloscope which comprise the test data sensing and indicating means.

Figure 4:
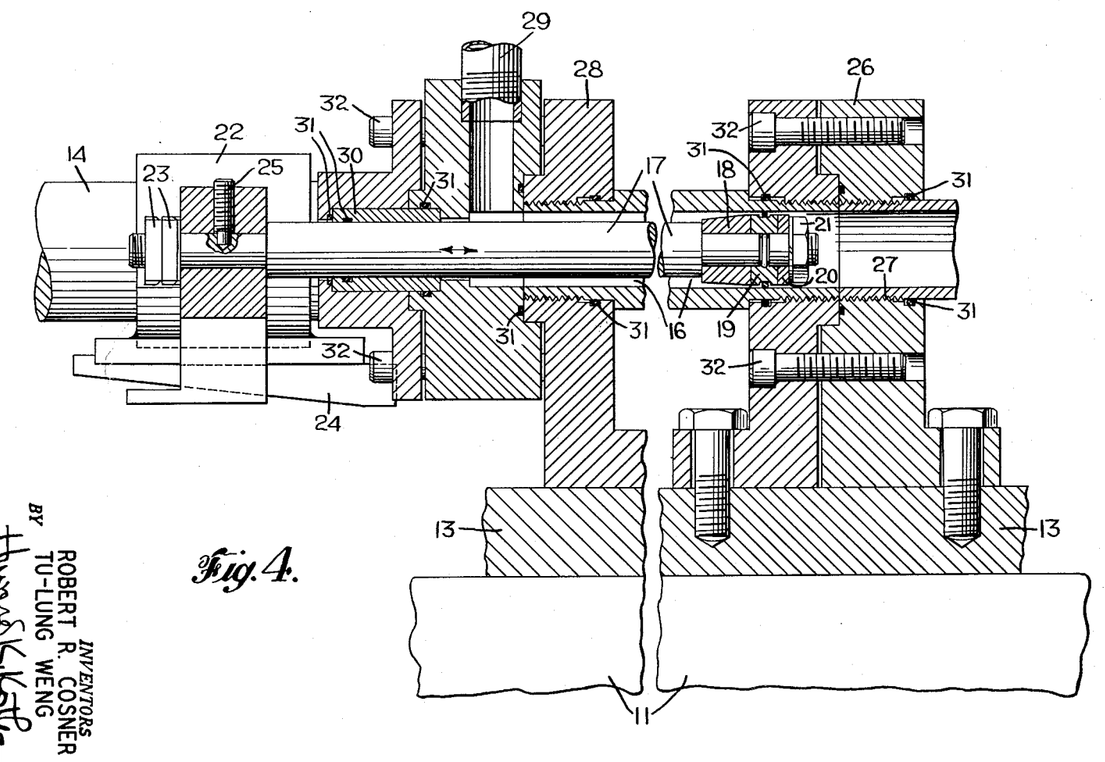
FIGURE 4 is an enlarged partial sectional view showing the arrangement of the main hydraulically operated components of the present invention.

Referring to FIGURE 4, the actuating assembly may be seen in greater detail. Cylinder 16 is threaded on both ends. One end is screwed into a tapped hole in a first portion of head port split block 26 and the other end is screwed into a tapped hole in a first portion of end port split block 28. Hydraulic fluid inlet threaded connection 27 is screwed into a tapped hole in a second portion of head port split block 26 and outlet threaded connection 29 is screwed into a tapped hole in a second portion of end port split block 28. The head port end of piston rod 17 is reduced in cross section and threaded for a portion of the reduced length to hold a piston head assembly comprising tapered cushion ring 18, piston ring 19, disc washer 20 and assembly locknut 21. The shape of tapered cushion ring 18 permits full piston travel to the end port portion of cylinder 16 without blocking end port 29 and thus permits reverse pressure for the retracting stroke to be exerted against the end port side of the piston head assembly. Tapered cushion ring 18 also provides a mechanical buffer means which will absorb shock in the event of malfunction of deceleration valve 38. Piston ring 19 provides annular support for the head portion of the piston assembly as it moves reiprocally in cylinder 16 and a sealed bronze bushing 30, supported by and compressively held between said second portion and a third portion of end port split block 28, provides annular support for the piston assembly at the end port split block 28 station. The driving head end of piston rod 17 is reduced in cross section and threaded for a portion of the reduced length to accommodate driving crosshead 22, secured axially by locknuts 23 and both axially and rotationally by pointed set screw 25 which engages a recess in the reduced portion of piston rod 17. The outboard portions of driving crosshead 22 contain cylindrical bores lined with suitable slide bearings and form journals which slideably engage the guide rods 14. Above-mentioned deceleration cam 24 and magnetized rod 41 are mounted on an outboard journal portion of driving crosshead 22.

The entire actuating assembly is leak-tightly sealed by O-rings 31 of various sizes as shown on the drawings. The several portions of head port split block 26 and of end port split block 28 are held together, respectively, by assembly screws 32.

In the embodiment of the drawings, load sensing means 34, comprises a metal strip, four resistance element type strain gages bonded to said metal strip and connected to form an electrical bridge circuit, means for electrical circuit connections, and a suitable protective cover. Two of the resistance elements are bonded to the metal strip axially to sense strain therein and two are bonded to the metal strip transversely to complete the required number of bridge circuit elements. The bridge circuit arrangement is used to provide automatic compensation for temperature aberrations which may occur. Since one end of the metal strip portion of load sensing means 34 is attached to slideably movable specimen anchor jaw 35 and the other end is rigidly fixed to specimen bed 33, stress developed in the test specimen is transmitted to the metal strip and causes straining therein. The axially arranged strain gage resistance elements bonded to the metallic strip are likewise strained and consequently undergo resistance changes causing bridge unbalances which result in detectable bridge output voltages. By using different metals or metals of different thicknesses, a variety of load sensing assemblies can be made to serve a variety of loading ranges.

FIGURE 6 is a schematic diagram of a load sensing circuit used in the present invention. Four strain gage resistance elements, 34a, 34b, 34c, and 34d, form the four arms of a Wheatstone bridge; 34b and 34d being the elements bonded axially to the metal strip portion of load sensing means 34, and 34a and 34c being the elements transversly fixed to the strip. Any suitable source, 34e, may be used to energize the bridge. In the preferred embodiment a laboratory type rectifier unit with a 110 volt 60 cycle A.C. input and a 45 volt D.C. output was used. Bridge random output is balanced by means of two potentiometers, 34f for coarse adjustment and 34g for fine adjustment.

Load resistor 34h is connected across the bridge output terminals to provide a stabilized voltage output for use as the signal to be applied to the oscilloscope vertical amplitude input terminals. Working capacitor 34i is also installed across the bridge output terminals to bypass circuit stray pickup which would distort the oscilloscope image. Resistor 34j, installed between the negative side of the D.C. source and the tap on potentiometer 34f, attenuates circulating current through the D.C. source when potentiometers 34g and 34f are at or near the resistance-all-out positions. The function of resistor 34k, arranged to be selectably switched into parallel relationship with bridge resistance element 34b, is to provide a means for checking the calibration of the load sensing circuit.

The values of the various resistance elements used in the load sensing bridge and related circuit are chosen to produce a sutiable input signal for the oscilloscope employed as the detecting means. In the preferred embodiment, a commercially available oscilloscope, with a maximum vertical sensitivity of 0.001 volt for full scale deflection and 24 selectable calibrated horizontal sweep rates from 0.5 microsecond percentimeter to 500 milliseconds per centimeter, is used and the resistance values are:

| Strain gage resistance elements— | Resistance, ohms |
|---|---|
| 34a, 34b, 34c and 34d | 500 |
| Coarse balancing potentiometers 34f | 5,000 |
| Fine balancing potentiometer 34g | 20,000 |
| Load resistor 34h | 500 |
| Current limiting resistor 34j | 5,000 |
| Calibration check resistor 34k | 250,000 |

Capacitance value of working capacitor 34i is selected to suit the environmental conditions in which the invention is operated and its voltage rating should be suitable for use with the source 34e employed. In the embodiment of the drawings, the capacitor used is rated at 25 microfarads, 50 working volts D.C.

The high speed tensile testing apparatus of the present invention is operated according to the following procedures.

The bridge of load sensing means 34 is energized and bridge output is balanced for a zero vertical reading on the oscilloscope by means of potentiometers 34f and 34g. With balance attained, a known load is applied to load sensing means 34 through specimen anchor jaw 35, causing bridge unbalance and a consequent vertical line signal on the oscilloscope. By means of the vertical amplitude adjustment on the oscilloscope, a calibration is established. Following calibration, the known load is removed and calibration check resistor 34k is momentarily switched into parallel with bridge strain gage resistance element 34b. The resulting oscilloscope vertical deflection is noted and thus establishes a check point for detecting deviations from the original calibration during testing operation. The original calibration is readily verified whenever resistor 34k is switched in and the observed deflection coincides with the check point deflection.

A horizontal oscilloscope sweep rate which will effect correspondence between the oscilloscope screen abscissa scale divisions and the desired elongation velocity for a particular test is selected and set.

With the sensing and indicating components of the apparatus thus calibrated, the specimen to be tested may be clamped in place and the hydraulic system may be operated. Reference to FIGURES 4 and 5 of the drawings will facilitate understanding of the hydraulic system operation.

The essential function of the hydraulic system is to deliver a precisely metered flow of hydraulic fluid to the head port end of cylinder 16, thereby driving the actuating piston assembly at a preselected constant velocity throughout the test travel and, by a reverse flow arrangement, to return the actuating piston assembly to its starting position when the test is completed. To accomplish this function, two constant delivery type pumps, 42 and 43, driven by electric motor 44 are arranged to deliver, either singly or in combination, depending on the required flow rate, hydraulic fluid to move the actuating assembly of the invention. Hydraulic fluid flow is controlled by means of flow control valves 45 and 46 in combination with relief valves 47, 48 and 49, four-way valve 51, and globe valves 53 and 54.

To operate the system, the actuating piston assembly is locked in the fully retracted position by solenoid operated latch 37 and the pump motor is started. Either one or both flow control valves are set for the flow rate corresponding to the desired test velocity. Should only one pump and its associated flow control valve be required, the flow control valve associated with the pump not used is valved fully closed, causing the discharge of the unused pump to pass directly to reservoir 50 through the relief valve 47 or 48 associated with the unused pump. Four-way valve 51 is adjusted to permit flow therethrough from port 51a to port 51b. Globe valve 53 is closed and globe valve 54 is opened, causing all flow from end port outlet 29 to pass through deceleration valve 38. Relief valve 49 is adjusted to close at a pressure sufficient to accelerate and maintain the desired constant velocity of the actuating assembly locked by solenoid operated latch 37, cylinder 16 cannot accept flow through head port inlet 27, the pressure in the system builds up to the setting of relief valve 49, and causes it to open and pass the hydraulic fluid flow back to reservoir 50. In a matter of seconds, the flow stabilizes, a condition readily detected by pressure gages installed at appropriate locations in the system, and solenoid operated latch 37 is energized, unlocking the actuating assembly. Fluid enters cylinder 16 through head port inlet 27, exerts pressure against the piston head and accelerates the actuating assembly to the desired constant velocity. As soon as flow to the cylinder commences, the pressure at relief valve 49 drops to a point below the relief valve setting, the relief valve closes and all fluid metered through the flow control valve or valves, as the case may be, is directed to the cylinder 16. As the actuating assembly moves, hydraulic fluid in cylinder 16 ahead of the piston head assembly is forced out through end port outlet 29, through globe valve 54 and deceleration valve 38 and is returned to the inflowing fluid stream at a point upstream from four-way valve 51. In this manner, that portion of cylinder 16 ahead of the piston head assembly, i.e. on the end port side, is made to act as a hydraulic differential chamber capable of contributing to the flow to head port inlet 27 and making possible the attainment of higher fluid flow rates than would otherwise be possible.

From this point on, the actuating assembly proceeds until deceleration cam 24, mounted on one of the outboard journal portions of driving crosshead 22, strokes the plunger of deceleration valve 38. As the tapered face of deceleration cam 24 depresses the plunger of the deceleration valve, the valve is gradually closed at a rate proportional to the velocity of the driving crosshead travel, thereby restricting the flow from the end port outlet 29 and decelerating the actuating assembly until the deceleration valve is fully closed and motion ceases. At this point the test is concluded and the motor 44 may be stopped. In the event that, prior to motor shut off, pressure in the system builds up to the point at which relief valve 49 re-opens, the pumped fluid will again be bypassed to reservoir 50.

To retract the actuating assembly to its starting position, preparatory to performing the next test operation, globe valve 53 is opened, globe valve 54 is closed and four-way valve 51 is adjusted to permit flow therethrough from port 51a to port 51c and from port 51b to port 51d. Motor 44 is again started and fluid is pumped to exert pressure against the end port side of the piston head assembly, thereby moving the entire actuating assembly in reverse. Hydraulic fluid displaced from the head port portion of cylinder 16 is returned to reservoir 50 through four-way valve 51 until the actuating assembly reaches the fully retracted position at which time it is again latched against movement. Excess pressure built up after the retracting stroke is completed is relieved through pressure relief valve 49 until the motor is stopped.

During the test stroke portion of the operation the driving crosshead 22, traveling at constant velocity, engages the specimen crosshead 36, and carries it to the end of the stroke, thereby stressing and straining the test specimen to failure. Stress developed in the specimen is indicated by the vertical deflection on the oscilloscope and is automatically correlated to the velocity of straining through the above described preselection of the oscilloscope horizontal sweep rate. The resulting oscilloscope trace corresponds to a stress-strain diagram for the material tested, which is photographed to provide a permanent record of the test data.

There is seldom exact synchronization between the start of a single horizontal sweep signal and the start of a vertical input load signal, because most times loading is initiated with the horizontal sweep somewhere in traverse across the oscilloscope screen. This causes most traces to be folded in appearance, i.e. the portion of the vertical input load signal not traced by the initially modulated horizontal sweep is traced by the following horizontal sweep. Reconstruction of such folded traces into continuous stress-strain diagrams is a simple manual step.

In the embodiment of the drawings, magnetic pickups 40 are arranged on a main frame member 11 to permit calibration and checking of the machine's test velocities. Each magnetic pickup 40 comprises a double concentric winding on a non-magnetic core. The flux field surrounding magnetized rod 41 induces a voltage in each pickup 40 as driving crosshead 22 progresses through its test travel. The induced voltages are used as input signals to any suitable detector means having a timing facility such as a constant speed recording potentiometer. In this manner, flow control valves 45 and 46 may be calibrated and periodically checked during testing operations. It will be apparent to those skilled in the art that with minor modifications in the arrangement of the magnetic pickups of the embodiment of the drawings, the voltages induced therein may be used as pulse signals to synchronize the horizontal sweep rate of the oscilloscope with the vertical input load signal and thereby eliminate the folded trace described above. In either case, test traces are usually manually replotted from the photographs in order to translate the oscilloscope screen coordinates to the scales normally used for stress-strain diagrams.

Figures 7, 10:
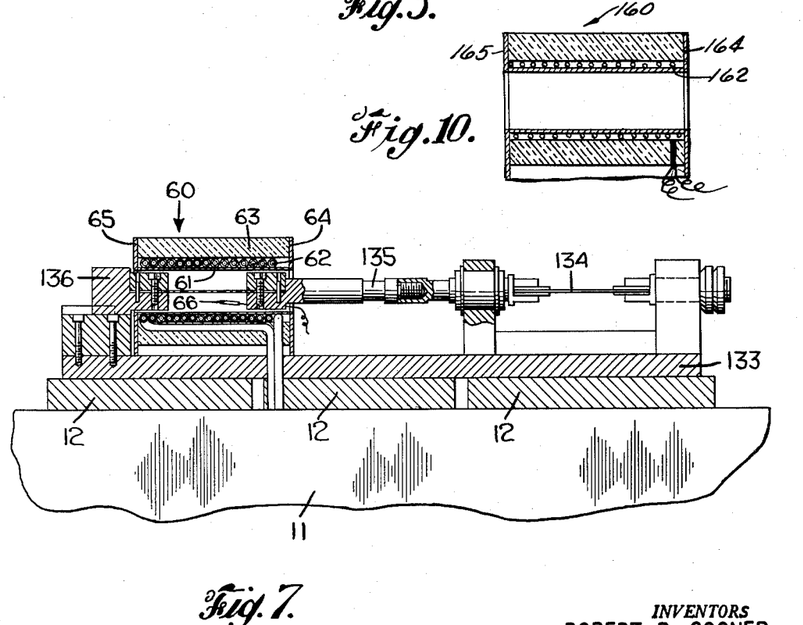
FIGURE 7 is a partially sectional view of a specimen holding subassembly and a temperature environmental chamber for use with the present invention.
FIGURE 10 is a sectional view of a heating chamber for use with the present invention.

In order to facilitate the study of the effects of temperature variations on the tensile properties of the materials tested, the present invention is provided with environmental chamber subassemblies for heating or cooling the specimen under test. To accommodate the environmental chamber subassemblies, certain minor modifications are made in the specimen holding subassembly. FIGURE 7 shows an environmental chamber 60, positioned on a specimen holding subassembly adapted to accommodate said chamber. A relatively shallow specimen bed 133, rigidly fixed to spacers 12, supports a load sensing means 134, a specimen anchor jaw 135 and a specimen crosshead 136. It will be noted that specimen anchor jaw 135 is a multipart elongate rod type component arranged to provide space for longitudinal movement of the environmental chambers when mounting and dismounting specimens.

In FIGURE 7, environmental chamber 60 comprises an inner liner 61, a continuous coil of tubing 62 for the circulation of a cooling medium, a covering of insulation 63, anchor jaw end plate 64 and specimen jaw end plate 65. A probe type thermocouple 66, provided to sense the temperature within the chamber for indication and control purposes, is supported by the specimen clamp end of specimen anchor jaw 135, which is, in turn, slideably supported in an upwardly projecting portion of specimen bed 133. The environmental chamber 60 rests on specimen bed 133 through integral feet on end plates 64 and 65, without contacting the specimen anchor jaw, the specimen crosshead or the specimen. When the specimen is being temperature conditioned, the chamber is in the position shown in FIGURE 7, but it may be moved longitudinally back over the rod portion of specimen anchor jaw 135 to change specimens.

A chamber for heating the specimen undergoing test, 160 in FIGURE 10 of the drawings, is similar to the environmental chamber 60 of FIGURE 7 but with a wound electric heating element 162 on a ceramic base in place of cooling coil tubing 62. Additional elements for each chamber comprise suitable tubing connections or electrical connections as the case may be.

Any suitable coolant susceptible to temperature control may be used in the cooling environmental chamber and any suitable source of electric current may be used to energize the heating environmental chamber. The probe type thermocouple 66 may be adapted to either indicate chamber temperature or, in automatic systems, to control chamber temperature.

In a typical example, the invention was used to obtain the stress-strain diagram for a sample of polyethylene resin. A vertical amplitude calibration corresponding to a fifty pound maximum load was established on the oscilloscope screen in the manner described above.

Figure 8:
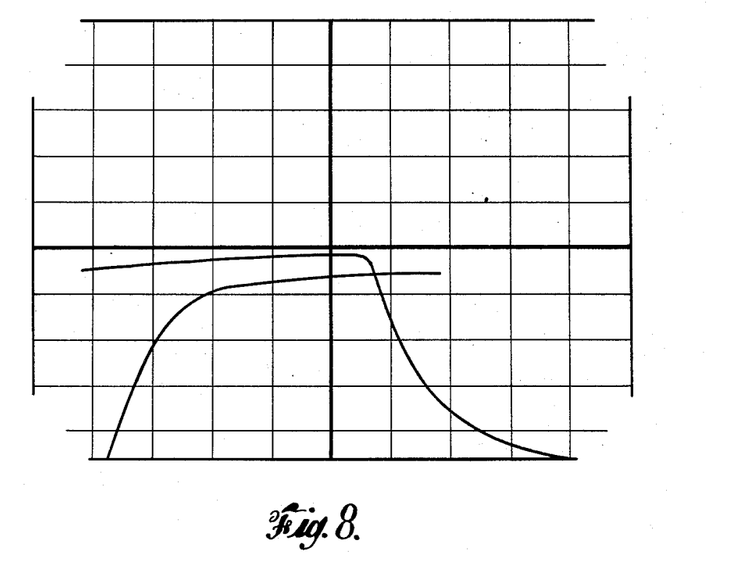
FIGURE 8 is a reproduction of an oscillographic trace obtained from a test performed with the present invention.

A straining velocity of 6650 feet per minute was selected and the horizontal sweep rate of the oscilloscope was set at 2 milliseconds per centimeter. A reproduction of the photograph of the oscilloscope trace is shown in FIGURE 8 of the drawings. It will be noted that the trace is folded in appearance, a phenomenon explained hereinabove.

Figure 9:
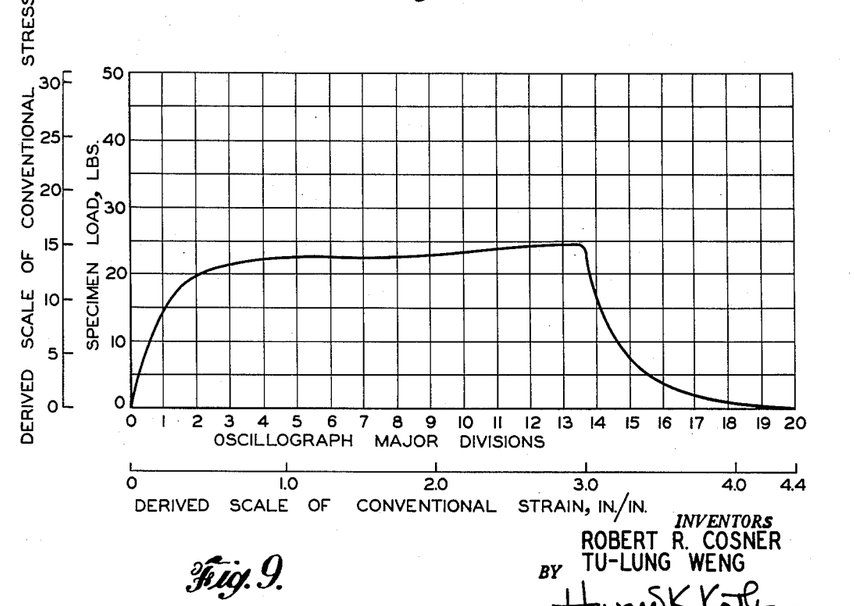
FIGURE 9 is a manually plotted stress-strain diagram constructed from the trace shown in FIGURE 8.

FIGURE 9 shows a manually replotted stress-strain diagram based on the photographic data of FIGURE 8. The unit strain abscissa scale is derived from the relationship:

$$s = VH/L_0$$

where:
$s$ = unit strain, in inches per inch for each scalar unit (centimeter) of the rectilinear coordinate abscissa axis.
$V$ = velocity, in inches per second, of the driving crosshead.
$H$ = oscilloscope sweep rate, seconds per centimeter.
$L_0$ = gage length or the originally chosen unit length of the test specimen (one inch).

The unit stress ordinate scale is derived from the relationship:

$$S = P/A$$

where:
$S$ = unit stress in pounds per square inch.
$P$ = applied load in pounds.
$A$ = original cross-section area of the test specimen in square inches.

The example illustrated by FIGURES 8 and 9 clearly indicates the accurate manner in which the present invention furnishes tensile test data at straining velocities heretofore unattainable.

What is claimed is:
1. Apparatus for tensile testing materials comprising in combination an elongate fixed main frame, a moveable driving assembly mounted to reciprocate slideably on guiding means arranged in longitudinally parallel relationship to said main frame and affixed thereto, means to selectably retain said driving assembly in a retracted position, actuating means to move and control the movements of said driving assembly whereby said driving assembly is accelerated from rest and propelled along the longitudinal axis of the apparatus at a constant velocity continuously selectable over a range of from about four inches per minute to about twelve thousand inches per minute, specimen holding means, having an anchor jaw moveable thereon and a specimen crosshead moveable thereon arranged to support material specimen in longitudinally parallel relationship to the motion path of said driving assembly affixed to the main frame at a distance from the driving assembly starting point sufficient to permit acceleration of said driving assembly to a selectable constant velocity within the velocity range of said actuating means and disposed to enable said driving assembly to engage and move to the end of travel the specimen crosshead thereon whereby a material specimen is elongated at a constant velocity, load sensing means operably connected between said specimen holding means and the anchor jaw moveable thereon, velocity sensing means disposed on the main frame and affixed thereto to sense the travel velocity of said driving assembly, indicating means for translating signals from said load sensing means into visual indicia of load at a rate corresponding to the travel velocity of said driving assembly and means for controllably varying the temperature of the environment of the material specimen tested.

2. Apparatus in accordance with claim 1 in which said means to selectively retain said driving assembly in a retracted position comprises an electrically operated solenoid latch.

3. Apparatus in accordance with claim 1 in which said actuating means comprises a hydraulic system.

4. Apparatus in accordance with claim 1 in which said load sensing means comprises a resistance element strain gage.

5. Apparatus in accordance with claim 1 in which said velocity sensing means comprises magnetically sensitive electrical transducers.

6. Apparatus in accordance with claim 1 in which said indicating means for translating signals from said load sensing means into visual indicia of load at a rate corresponding to the travel velocity of said driving assembly is a cathode-ray oscilloscope.

7. Apparatus in accordance with claim 1 in which said indicating means for translating signals from said load sensing means into visual indicia of load at a rate corresponding to the travel velocity of said driving assembly is an adjustable speed recording potentiometer.

8. Apparatus in accordance with claim 1 in which said cell means for controllably varying the temperature of the immediate environment of the material specimen tested comprises a cooling chamber.

9. Apparatus in accordance with claim 1 in which said cell means for controllably varying the temperature of the immediate environment of the material specimen comprises a heating chamber.

10. A method for testing the tensile properties of materials at selectable constant straining velocities comprising accelerating a moveable portion of a testing apparatus to a selectable constant velocity, maintaining said constant velocity while controllably directing said moveable portion of said testing apparatus to dynamically engage means attached to one end of the material to be tested, maintaining said constant velocity after dynamically engaging said last recited means while retaining the other end of the material to be tested in a substantially fixed position whereby said material is strained, and continuously and concurrently comparing the stress induced in said material with the straining velocity of said material.

References Cited in the file of this patent

"Stress-Strain Relationships in Yarns Subjected to Rapid Impact Loading," J. Research NBS 54, 269 (1955), RP 2589.